US006535117B2

(12) United States Patent
Haerer

(10) Patent No.: US 6,535,117 B2
(45) Date of Patent: Mar. 18, 2003

(54) ILLUMINATION DEVICE FOR SAFETY TRIANGLE

(76) Inventor: Bernell G. Haerer, 3408 Lydia La., Granite City, IL (US) 62040

( * ) Notice: Subject to any disclaimer, the term of this patent is extended or adjusted under 35 U.S.C. 154(b) by 0 days.

(21) Appl. No.: 09/829,312

(22) Filed: Apr. 9, 2001

(65) Prior Publication Data

US 2002/0171561 A1 Nov. 21, 2002

(51) Int. Cl.⁷ .................................................. B60Q 7/00
(52) U.S. Cl. ........................ 340/473; 40/903; 116/63 T; 340/908; 362/191
(58) Field of Search ................................ 340/908, 473; 40/591, 903; 116/63 T, 63 C, 63 P; 362/258, 103, 104, 105, 108, 191, 190

(56) References Cited

U.S. PATENT DOCUMENTS

| 3,975,849 | A | * | 8/1976 | Tuleja | 40/903 |
| 4,875,028 | A | * | 10/1989 | Chou | 40/903 |
| 4,952,910 | A | * | 8/1990 | Straten et al. | 340/473 |
| 5,349,346 | A | | 9/1994 | Wu | 340/908 |
| 5,606,309 | A | | 2/1997 | Smith | 340/473 |
| 6,193,385 | B1 | * | 2/2001 | Maki et al. | 362/108 |
| 6,227,677 | B1 | * | 5/2001 | Willis | 362/196 |
| 6,239,691 | B1 | * | 5/2001 | Preisler | 340/321 |

* cited by examiner

Primary Examiner—Brent A. Swarthout
(74) Attorney, Agent, or Firm—Don W. Weber

(57) ABSTRACT

An improvement to the standard highway traffic warning triangles is presented which provides greater illumination and visibility for the traffic warning triangles. The new device includes an essentially flat frame having upper and lower sections. The lower section of the frame can be attached to the upper vertical flange of the base leg of the traffic triangle. This attaching is accomplished either by the use of inwardly biased lower legs, inwardly biased staggered teeth or clips. Once the illumination frame is attached to the lower leg of the safety triangle, an illumination light unit having both strobing and flashing battery powered mechanisms can be attached to the upper section of the frame. This attachment of the light is normally by the use of magnets, but the light can also be permanently bolted to the frame or attached by other methods. The improvement draws greater attention to the traffic safety warning triangle at greater distances and can be deployed 50 feet or more from the actual hazard.

4 Claims, 2 Drawing Sheets

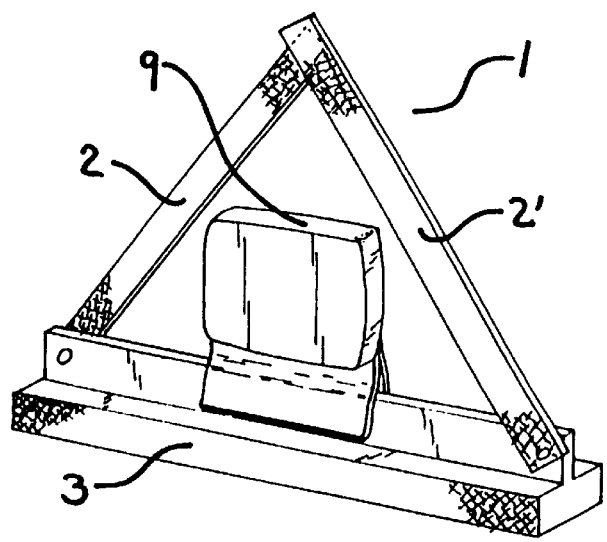
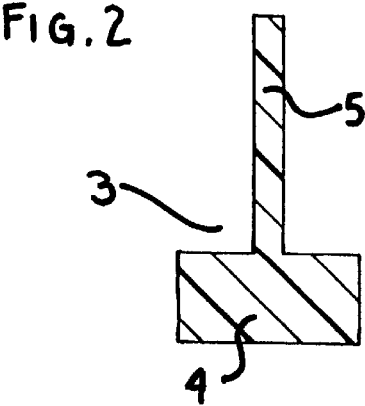
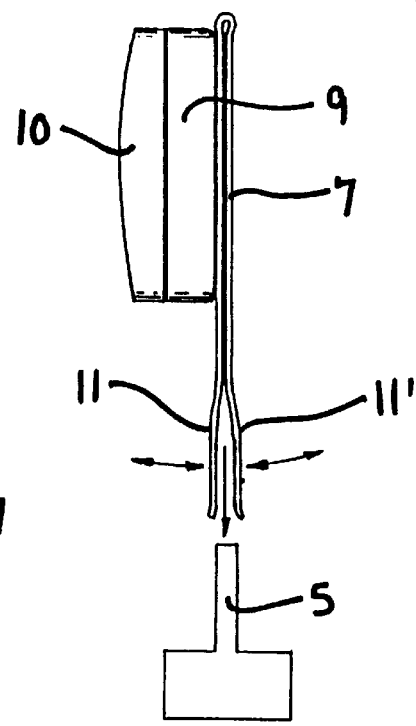
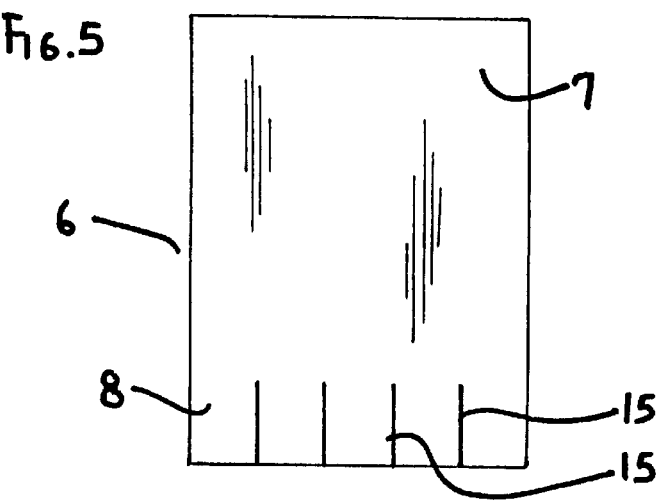

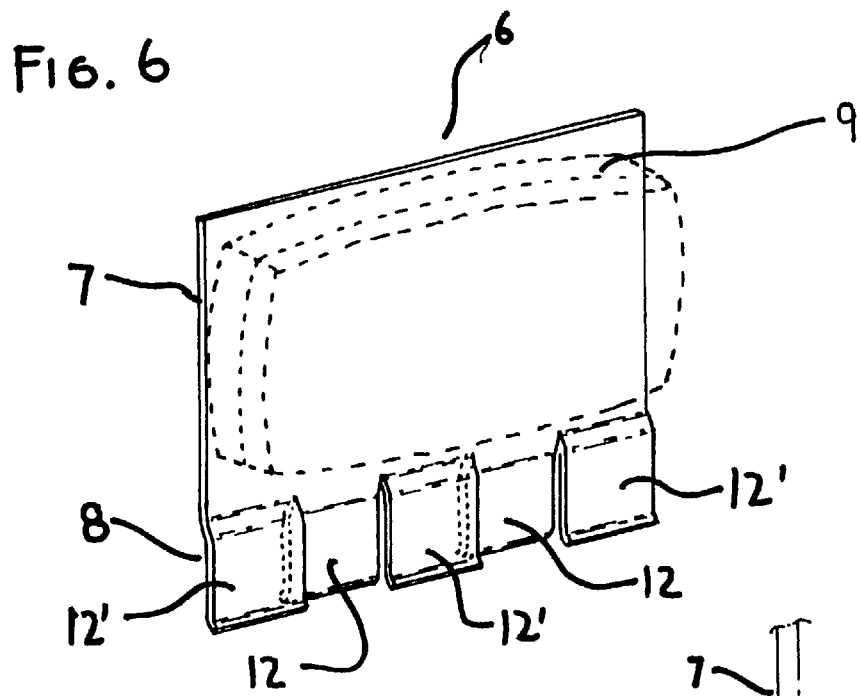
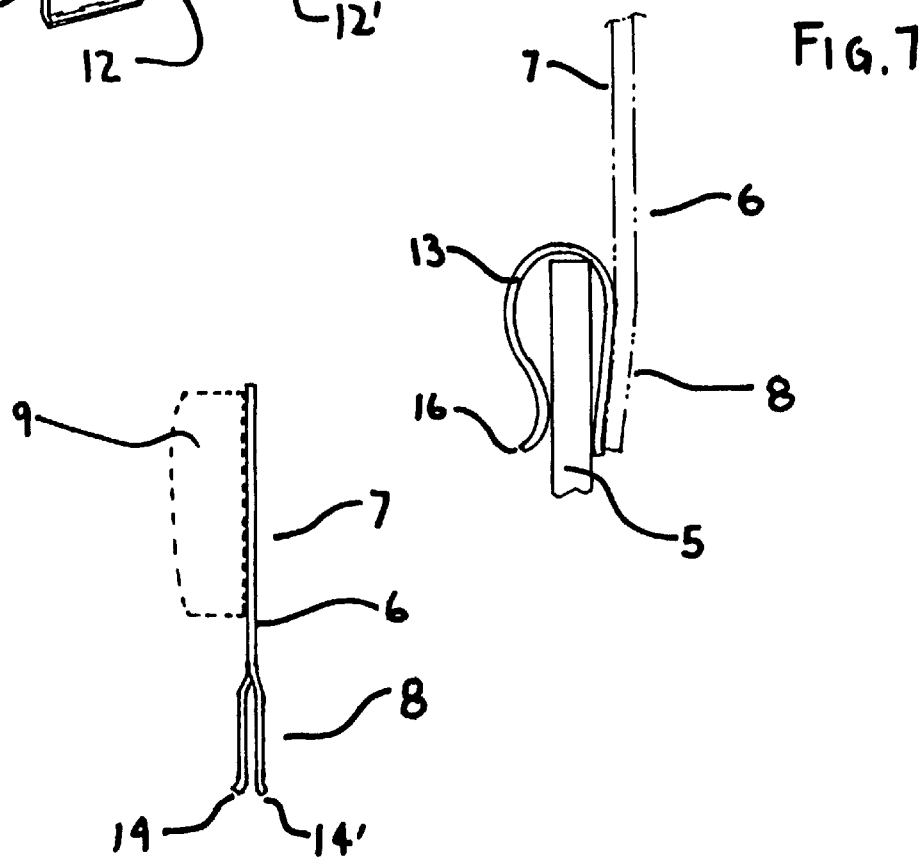

ILLUMINATION DEVICE FOR SAFETY TRIANGLE

BACKGROUND OF THE INVENTION

This invention relates to the field of highway safety devices. More particularly, this new invention is an improvement for the standard highway safety triangles. A device is presented which is readily attachable to standard safety highway triangles and which provides increased illumination.

With the advent of high speed travel by cars and trucks, a number of new and sometimes hazardous conditions have been created. Among the most hazardous of these conditions is caused when a car or truck breaks down and must be repaired or abandoned at or near the side of the highway. A number of devices have been devised which give oncoming motorists an early warning as to the road hazard created by such a breakdown or accident.

Among the types of warning devices commonly is use are standard highway safety triangles. These safety triangles include a lower base and an upper, frequently collapsible, triangular-shaped device. The triangle is now known in common use as a safety warning or hazard warning signal. In many states it is a legal requirement that trucks be equipped with such deployable warning triangles for use during a breakdown or accident to warn oncoming drivers of the approaching hazard.

It is not unknown in this field to use reflectors that enhance the visibility of the safety warning triangles once they are deployed. Many triangles contain reflector devices or reflecting tape that would reflect the oncoming vehicle's headlights in the triangular pattern thus illuminating the triangle.

Other approaches to increasing the visibility of these warning triangles include illuminating the triangles along the three sides.

One such illuminated triangle is found in the 1997 patent issued to Smith, U.S. Pat. No. 5,606,309. The Smith device includes a series of lights within the three sides of the triangle.

Special warning lights have been designed to be placed along the three sides of the warning triangle. One such set of warning lights located within the three sides of the triangle are found in the 1994 patent issued to Wu, U.S. Pat. No. 5,349,346. One drawback of illuminating the three sides of the warning triangle only is that the visibility of the triangle is only minimally enhanced in poor or adverse lighting conditions. It is an object of this invention to provide a traffic warning triangle whose visibility has been greatly enhanced.

Other approaches to increasing the visibility of traffic safety triangles include the use of small lights or reflectors located within the interior of the traffic warning triangle. One such light is found in the 1989 patent issued to Chou for a warning triangle, U.S. Pat. No. 4,875,028. Chou involves an inner triangular surface which is illuminated by two small lightbulbs.

U.S. Pat. No. 4,952,910, issued to Straten, provides a warning triangle for motor vehicles including a central reflector 13 and a lower illuminated distance marker.

While Chou and Straten are an improvement over the non-illuminated safety warning triangles, they still do not provide a sufficient high visibility warning light capable of alerting an oncoming driver of a dangerous road condition at a great distance. It is another object of this invention to provide a highly visible illuminated flashing or strobing light capable of warning an oncoming driver of a hazardous condition at a great distance from the hazard location.

Another drawback of the standard improvements to traffic warning triangles is the need for most of the triangles that are illuminated to be attached to a power source. Some of these warning triangles are powered from the cigarette lighter power source located in the vehicle. Once such example of such an electrified warning device is found in the 1989 Chou patent. However, because these illuminated traffic safety triangles must be connected to the automobile itself, deploying the triangle at a distance of more than ten or fifteen feet from the automobile is difficult due to the limitations of the length of the cord. It would be preferable to have an illuminating warning device capable of being placed at a distance of fifty feet or more from the automobile. Such a warning device must have an independent power source. It is a still further object of this invention to provide a highly visible illuminated traffic warning triangle having an independent power source such that the entire warning device can be located at least fifty feet or more from the actual hazard.

While many of the devices previously known in the art improve over the ordinary reflector, there is a need in the industry to provide a highly visible traffic warning device which immediately draws the oncoming driver's attention to the location and existence of the traffic hazard. It would also be beneficial to the industry if a device were presented which could be added on to existing non-illuminated traffic warning signals to fully illuminate the composite device. This new illumination improvement would have to be adaptable to be attached to existing traffic warning triangles.

It would also be highly desirable if the new attachable device would strobe or blink so as to make the entire device much more visible and so as to attract the oncoming driver to the approaching hazard. It is a still further object of this invention to provide an improvement to existing traffic warning triangles that is readily attachable to the interior of the triangle and which provides a highly visible strobing or flashing light. Further and other objects of this invention will become apparent upon reading the below described Specification.

BRIEF DESCRIPTION OF THE DEVICE

A standard, collapsible traffic warning triangle has two upper legs and a lower leg having a base. The three legs form an equilateral triangle having a horizontal lower base. The lower base has a vertical flange. The new improvement presented herein includes an illumination frame having an upper section for attaching a strobing or flashing light source, and a lower attaching section adapted to be received by the upper flange of the lower base of the standard warning triangle. The lower section of the illumination frame is designed such that it may be attached to the vertical flange of the lower leg of the highway triangle, either by means of inwardly biased legs, staggered teeth or clips. A strobing or flashing illumination light unit having an independent power source may be attached to the upper portion of the frame by magnetic or other attaching means. The illumination frame and light unit is readily adapted to be removably attached to the standard highway safety triangles now in use.

BRIEF DESCRIPTION OF THE DRAWING FIGURES

FIG. 1 is a perspective view of a standard highway triangle in its deployed position, with the illumination frame and light unit attached to the lower leg.

FIG. 2 is a cross section of the highway safety triangle base.

FIG. 3 is a side view of the illumination frame having inwardly biased legs as an attaching means.

FIG. 4 is an exploded side view of the illumination frame and light panel and the lower triangle base, showing how the improvement illumination frame and light unit attaches to the upper flange of the triangle base.

FIG. 5 is a front view of the illumination light unit having staggered teeth attaching means.

FIG. 6 is a perspective view of the illumination frame having lower staggered teeth attaching means.

FIG. 7 is a side view of the illumination frame having lower clip attaching means.

DESCRIPTION OF THE PREFERRED EMBODIMENT

A standard highway safety triangle 1 is shown in its deployed position in FIG. 1. This standard highway safety triangle comprises three legs of the same length. The triangle, when deployed, would have upper side legs 2 and 2' pivotably connected to a horizontal base 3. Since the upper sides and base are of equal distance, the device forms an equilateral triangle when it is deployed as shown. When the devise is not in use, the upper legs of the triangle are folded so that they are parallel to the lower base. The safety highway triangle can then be conveniently stored.

In order to deploy the triangle, once the legs are pivoted and formed into the equilateral configuration shown in FIG. 1; the base is set on the ground or highway surface at a suitable distance from the breakdown or accident. The lower base 3 comprises essentially two parts, being a lower, flat horizontal part 4 and an upper, vertical flange 5. In many of the standard highway safety triangles all three legs, 2, 2' and 3, have a cross section similar to that shown in FIG. 2. However, at least the base leg 3 must have the flat horizontal lower part 4 in order for the highway safety triangle device to stand upright when it is placed on the ground or highway.

Turning now to FIG. 3, one embodiment of the current device is shown. The device has two main parts, an upper essentially flat illumination frame 6, which may have a generally rectangular shape as shown in FIGS. 5 and 6. The illumination frame 6 has two sections, a flat upper portion 7 capable of receiving the illumination light panel 9 and a lower attaching portion 8. The lower attaching portion 8 has a structure adapted to receive the upper vertical base flange 5 of the highway safety triangle 1, as best shown in FIG. 4.

Several means of attaching the illumination frame 6 to the horizontal flange 5 may be utilized in practicing this invention. One such attaching means includes inwardly biased legs 11 as best shown in FIGS. 3 and 4. These legs are inwardly biased as shown by the curved arrows in FIG. 4. The left 11 and right 11' legs are biased inwardly such that they must be pried open by the vertical base flange 5 when the illumination frame is inserted over the base flange. The lowest tip ends 14 and 14' of the left and right biased legs, 11 and 11' respectively, are tapered outwardly. These outwardly tapered tips 14 and 14' facilitate placing the inwardly biased legs over the vertical flange 5.

Yet another means of attaching the illumination frame 6 to the horizontal base flange 5 is shown in FIGS. 5 and 6. This attaching means consists of a number of alternately staggered teeth 12 and 12' as best shown in FIG. 6. In manufacturing this embodiment, the lower attaching portion 8 of the illumination frame 6 receives a series of vertical cuts 15 as shown on FIG. 5. These vertical cuts 15 create a number of lower teeth 12. Alternately occurring teeth 12 are pushed slightly rearwardly as shown in FIG. 6, while alternate teeth 12' are pushed slightly forward. These inwardly biased staggered teeth create an attaching means similar to the inwardly biased leg attaching means shown in FIGS. 3 and 4. The upper portion 7 of the illumination frame 6 of this embodiment is similar to the upper portion of the illumination frame shown in the inwardly biased leg attaching means embodiment illustrated on FIGS. 3 and 4.

Another attaching means is shown in FIG. 7. This lower attaching means comprises a clip 13 attached to the backside of the illumination frame 6. The clip 13 has a lower outwardly protruding lip 16. This outwardly protruding lip 16 facilitates the insertion of the upper vertical flange 5 between the clip 13 and the lower attaching portion 8 of the illumination frame 6, as shown.

Any of the three attaching means described above are suitable in practicing this invention. The illumination frame 6 is ideally made of metal with a thickness sufficient to support an illumination light unit 9, as shown in FIGS. 1 and 4, and as shown in phantom in FIGS. 3, 6 and 7. This illumination light unit 9 has an opaque front lens 10. The opaque front lens 10 generally has an orange or red tint indicating an extreme hazard.

The illumination light unit 9 consists of an independent power source, usually a battery, and a number of illuminating lights. It also consists of a microchip that allows the illuminating lights to strobe or flash, depending on the mode set by the operator by a switch on the back part of the light panel. The light unit may also have a number of independently illuminated light emitting sources (bulbs or LEDs) which may be sequentially lighted to form a pattern. These strobing and flashing illumination light units are common in the industry. These light panels are made to strobe or flash in a pattern, and generally have an independent power source. However, heretofore, the well known illumination light units have not been joined with the illumination frame having lower attaching means as shown and described in the present structure.

The illumination light unit 9 is attached to the upper portion 7 of the illumination frame 6 by suitable means. In the preferred embodiment, the illumination light unit 9 is magnetic. Since the unit 9 is magnetic and since the illumination frame 6 is made of metal, the illumination light unit 9 is readily and adjustably attached to the upper portion 7 of the illumination frame.

Although magnetic attachment is the preferred means of attaching the light unit 9 to the frame 6, other means may also be utilized while still keeping within the spirit and disclosure of this device. For example, hook and pile fasteners may be utilized to secure the light unit to the upper portion of the frame. Similarly, other types of detachable fasteners may be utilized in practicing this device. In fact, it is not necessary for the illumination light unit 9 and the illumination frame 6 to be removably detachable from each other, and a device having the light unit and upper portion of the frame permanently attached to each other would be suitable for practicing this device, providing a lower attaching means adapted to receive the upper flange 5 of the standard highway safety triangle device is also present.

The essence of this device is to provide an improvement to the standard highway safety triangles which are currently in use. This improvement adds a detachable strobing or flashing highly visible light source to the central portion of standard highway safety triangle markers. Since literally millions of these markers are currently in existence, it is highly desirable to provide an improvement which is readily adaptable to the standard highway safety triangles already in use but which will provide greater visibility and safety. This particular device has already been approved by the Illinois Department of Transportation and has received favorable comment from the Federal Department of Transportation. Because the device is an add-on improvement, and is readily adaptable to the current highway safety devices now in use, it is a highly desirable addition and improvement to the standard highway safety hazard devices now in use. Obviously, minor variations of the attaching means or illumination means described herein would be within the spirit and keeping of the instant disclosure and new improvement disclosed.

Having fully described my device, I claim:

1. A highway safety warning triangle and illumination light, in combination, comprising:

(a) a collapsible triangle having three pivotably connected legs, wherein the base leg of said triangle comprises a lower, flat horizontal part and an upper vertical flange; and wherein one end of a first upper side leg is pivotably connected to a first end of said base leg and one end of a second upper side leg is pivotably connected to the second end of said base leg, wherein the upper legs may be folded so that said upper legs are parallel to said upper vertical flange, with top edges of the upper legs positioned at the top edge of the vertical flange, and bottom edges of the upper legs positioned at the intersection of the flat horizontal part and the upper vertical flange, for compact storage of said triangle when said triangle is not in use;

(b) an upper, essentially flat illumination frame, wherein said frame comprises a flat upper part adpated to receive a light panel and a lower attaching part, wherein said lower attaching part is adapted to detachably secure said illumination frame to the upper vertical flange of said triangle; and (c) an illumination light unit detachably secured to said illumination frame, said light unit comprising a plurality of lights, a power source and a control means, wherein said lights may be set to flash, strobe or light constantly or sequentially;

wherein said warning triangle and detachable illumination light may be compactly stored when not in use.

2. A highway safety warning triangle as in claim 1, wherein said lower attaching part comprises inwardly biased legs having outwardly tapered tips adapted to detachably receive said vertical flange of the base leg of said triangle.

3. A highway safety warning triangle as in claim 1, wherein said lower attaching part comprises a first set of alternately staggered teeth pushed slightly forward, and a second set of alternately staggered teeth pushed slightly rearward, each set of teeth positioned on oppositee sides of said vertical flange of the base leg said triangle.

4. A highway safety warning triangle as in claim 1, wherein said lower attaching part comprises a clip adapted to detachably receive said vertical flange of the base leg said triangle.

* * * * *